(12) United States Patent
Calame et al.

(10) Patent No.: US 12,009,199 B2
(45) Date of Patent: Jun. 11, 2024

(54) TUBULAR ELECTRODELESS LAMP

(71) Applicant: Lumartix SA, Aubonne (CH)

(72) Inventors: Laurent Calame, Châtelaine (CH); Andreas Meyer, Féchy (CH)

(73) Assignee: LUMARTIX SA, Aubonne (CH)

( * ) Notice: Subject to any disclaimer, the term of this patent is extended or adjusted under 35 U.S.C. 154(b) by 0 days.

(21) Appl. No.: 17/997,254

(22) PCT Filed: Apr. 27, 2021

(86) PCT No.: PCT/IB2021/053448
§ 371 (c)(1),
(2) Date: Oct. 27, 2022

(87) PCT Pub. No.: WO2021/220147
PCT Pub. Date: Nov. 4, 2021

(65) Prior Publication Data
US 2023/0082751 A1 Mar. 16, 2023

(30) Foreign Application Priority Data
Apr. 29, 2020 (EP) .................................... 20171994

(51) Int. Cl.
*H01J 65/04* (2006.01)
*H01J 61/82* (2006.01)

(52) U.S. Cl.
CPC .......... *H01J 61/827* (2013.01); *H01J 65/044* (2013.01)

(58) Field of Classification Search
CPC .......... H01J 61/827; H01J 65/00; H01J 65/04; H01J 65/042; H01J 65/044

USPC ......................................................... 313/634
See application file for complete search history.

(56) References Cited

U.S. PATENT DOCUMENTS

| | | | |
|---|---|---|---|
| 3,872,349 A | 3/1975 | Spero et al. |
| 5,886,480 A | 3/1999 | Penzenstadler et al. |
| 6,566,660 B1 | 5/2003 | Stowe |
| 2004/0155591 A1 | 8/2004 | Schmitkons et al. |
| 2008/0192172 A1 | 8/2008 | Graziadei et al. |

(Continued)

FOREIGN PATENT DOCUMENTS

| | | |
|---|---|---|
| EP | 2721631 B1 | 8/2016 |
| JP | H1167159 A | 3/1999 |
| WO | 2014010959 A1 | 1/2014 |

OTHER PUBLICATIONS

International Search Report for issued in Application No. PCT/IB2021/053448 dated Nov. 9, 2021.
Written Opinion for PCT/IB2021/053448 dated Nov. 9, 2021.

*Primary Examiner* — Christopher M Raabe
(74) *Attorney, Agent, or Firm* — Pearne & Gordon LLP

(57) ABSTRACT

An electrodeless discharge lamp with one or more stationary light emitting bulbs inside a common conductive shield to confine an electromagnetic excitation field provided by a plurality of sources. Each bulb can be excited by several electromagnetic radiation sources or by an individual electromagnetic radiation source. Tubular realization of the lamp, with two magnetron or transistor electromagnetic sources facing each other at the extremity of a tubular bulb, are particularly suitable for installation at the focal line of parabolic trough reflector. Some variants combine bulbs of different compositions, and excitation levels can be independently set to control the spectrum of emitted light.

12 Claims, 3 Drawing Sheets

(56) References Cited

U.S. PATENT DOCUMENTS

| | | |
|---|---|---|
| 2009/0160345 A1 | 6/2009 | Bretmersky et al. |
| 2009/0322240 A1* | 12/2009 | Espiau ............... H05B 41/2806 |
| | | 313/161 |
| 2010/0171436 A1* | 7/2010 | DeVincentis ......... H01J 65/044 |
| | | 315/248 |
| 2014/0062298 A1* | 3/2014 | Brockett ............ H05B 41/2813 |
| | | 315/39 |
| 2014/0125225 A1 | 5/2014 | Calame et al. |
| 2014/0265831 A1* | 9/2014 | Harbourne ............ H01J 61/302 |
| | | 220/2.1 R |
| 2016/0042828 A1* | 2/2016 | Borsuk .................... G21K 1/00 |
| | | 250/492.1 |
| 2019/0096656 A1* | 3/2019 | Do ........................ H01J 65/044 |

* cited by examiner

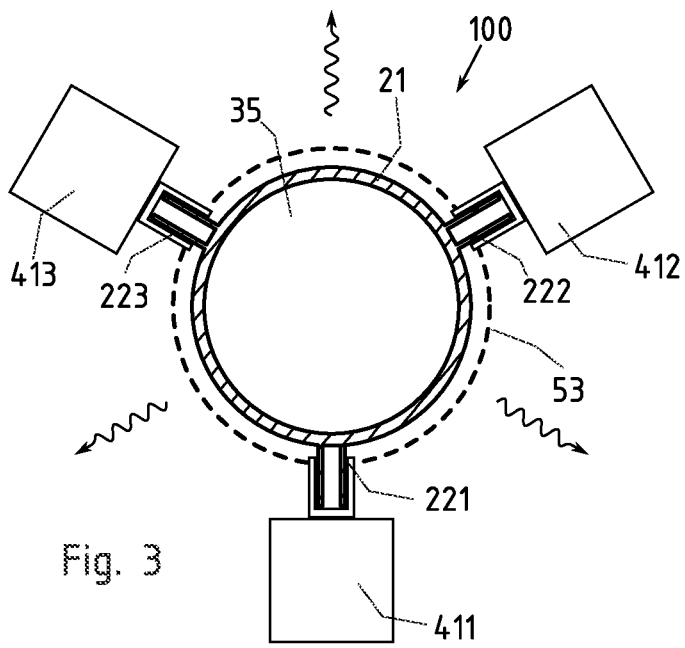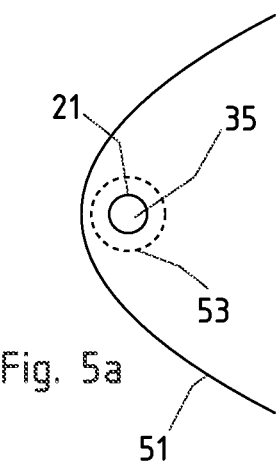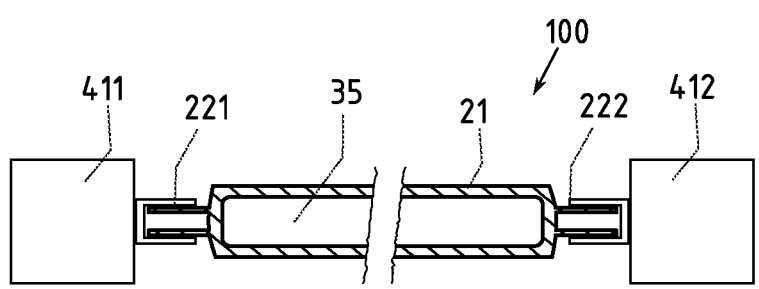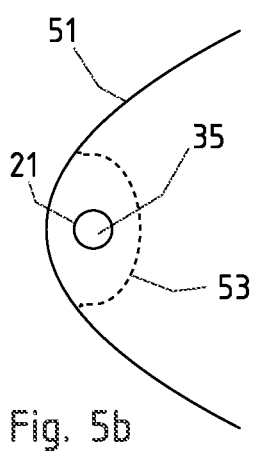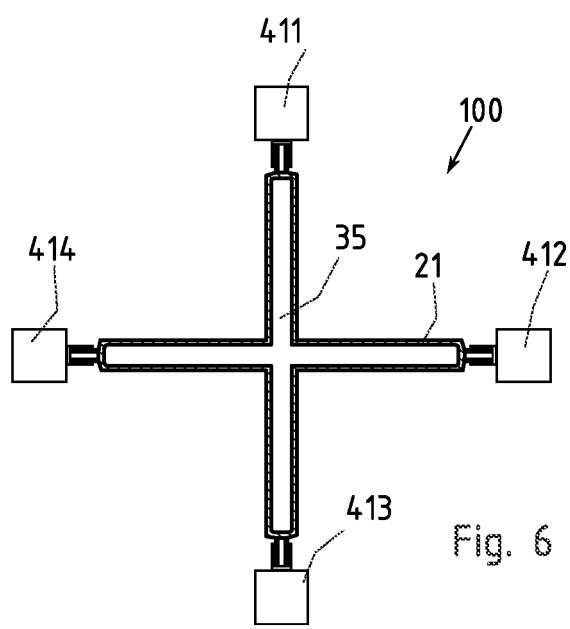

TUBULAR ELECTRODELESS LAMP

TECHNICAL DOMAIN

The present invention concerns discharge lamps, in particular electrodeless discharge lamps in which a light emitting plasma is generated by electromagnetic (EM) energy wave or waves in the range between high frequency (HF) and microwaves

RELATED ART

High-intensity discharge (HID) lamps are known for their high efficiency at turning energy into visible light. Compared to traditional incandescent or halogen lamps, HID lamps have a favourable light to heat ratio, rendering them suited to a variety of applications, which require as much visible light per watt as possible. Such applications include lighting for streets, sports facilities, stadiums, commercial centres, exhibition fairs but also artificial lighting systems for plant growth and for testing photovoltaic equipment.

Discharge lamps consist essentially of a transparent light bulb containing a chemical composition which can be excited to a light-emitting state by an appropriate energy source. Traditionally HID lamps are powered by electric energy, wherein an electrical discharge is sent between two tungsten electrodes, usually made from tungsten, and through the chemical composition which is heated and ionized to a luminous plasma. The composition is an inert carrier gas, preferably a noble gas such as neon, xenon, argon, or krypton, containing an active component, also called the fill material, usually a metal salt, for example a metal halide.

By removing the electrodes and providing electromagnetic rather than an electrical energy to excite the chemical composition, metal parts can be entirely omitted from the light bulb. This brings several advantages. Firstly, glass-metal interfaces in the bulb are avoided, reducing cost and improving lifetime of the bulb. In addition, a greater variety of active components which are not chemically compatible with metal electrodes can be used for light-generation, such as Sulphur, Selenium, Tellurium and others.

The electromagnetic radiation source, powering the electrodeless plasma discharge lamps can be a electromagnetic generator, frequently a microwave source such as a magnetron or a solid-state device, such as a transistor, emitting electromagnetic radiation in a suitable band of the electromagnetic spectrum, such as one of the ISM radio bands including the 6.78 Mhz, 13.56 Mhz, 27.12 Mhz, 40.68 Mhz, 433 Mhz, 915 MHz, 2.45 GHz or 5.8 Ghz band. Magnetrons or transistor amplifiers are readily available at attractive prices and therefore often a preferred choice as power source for plasma lamps.

In order to avoid the formation of hot spots, which is a common problem in electrodeless discharge lamps, and overheating of the bulb material, bulbs are usually kept in rotation, which causes a variety of operational and stability problems.

EP2721631 offers a solution to overcome the need for rotation. The stationary bulb described in this document is equipped with a dielectric rod, which couples the electromagnetic source to the light bulb ensuring a better temperature distribution in the plasma bulb. The present invention uses the approach disclosed in this prior art document.

Despite the better temperature management achieved in EP2721631, the distribution of the electromagnetic energy, e.g. the microwave, throughout the light bulb is not entirely homogeneous and areas of different heated and ionized plasma continue to limit the performance, in particular the brightness, of the discharge lamp. Also, better absorption of electromagnetic energy in particular areas may contribute to the attenuation of the energy in a light bulb with elongated shape or greater geometrical complexity. The brightness of a discharge lamp is limited by the power of the electromagnetic source and by the thermal limitations of the bulb envelope.

It is one aim of the present invention to provide an electrodeless electromagnetic powered discharge lamp with increased brightness. The invention furthermore aims to extend the range of suitable bulb shapes said discharge lamps.

Short Disclosure of the Invention

According to the invention, these aims are accomplished by the object of the claims of this invention, and especially by the independent claim.

In particular, the object of the invention is attained by an electrodeless discharge lamp for providing visible and/or infrared and/or UV radiation comprising an electrically conductive envelope that is at least partially transparent to visible or/and infrared or/and UV radiation, one or more stationary light emitting bulbs inside the conductive envelope, the one or more bulbs being filled with a composition that emits light when in plasma state, a plurality of electromagnetic sources each electromagnetic source having an output terminal radiating a electromagnetic field for ionizing and heating the composition in the one or more bulbs to bring the bulb fill in a plasma state.

Dependent claims deal with features that are optional and possibly advantageous, but not essential, such as the conductive envelope having at least a region constituted by a conductive mesh; bulbs made of fused silica, electromagnetic sources in the microwave range; one or more dielectric rods aligned with one of the output terminals of the electromagnetic source and positioned between the respective output terminal and the bulb acting as dielectric waveguide for the electromagnetic field, coupling the electromagnetic source with the bulb; at least one of the stationary light-emitting bulbs is electromagnetically coupled with more than one electromagnetic source; a plurality of stationary light emitting bulbs filled with compositions having different spectra of emission and coupled to different electromagnetic sources and the electromagnetic sources can be operated at variable, independently-settable power levels; a cross-shaped light emitting bulb or star-shaped light emitting bulb; tubular light bulbs with one or two electromagnetic sources at the extremities; and a concave or parabolic light concentrator.

Several luminous compositions can be used in the frame of the invention. Among these, composition of an inert gas, a first active component consisting of a mixture of antimony halide or bismuth halide, a second active component consisting in a halide or in a mixture of halides of one or more of In, Sn, Ag, Cu, Pb, Fe, Hg, Co provided valuable results.

With respect to what is known in the art, the invention achieves an increase in brightness over existing electrodeless discharge lamps by coupling a plurality of electromagnetic energy sources to one or more light bulbs in a discharge lamp composed with one electromagnetic cavity. The electromagnetic energy sources are suited to ionize and heat the chemical composition in the light bulb to its luminous plasma state.

Electromagnetic energy sources include radiofrequency (RF) from HF to ultra-high frequency (UHF) bands and/or microwave (MW) sources, for instance a magnetron tube or a or a couple of transistors generating a electromagnetic waves at the desired frequency and intensity. In the following the energy source is described as a magnetron for concision. However, the invention is not limited to a magnetron as an electromagnetic energy source.

The use of a plurality of magnetrons or other electromagnetic sources furthermore allows for more liberty in design, in particular relating to the shape of the plasma light bulb. Conventional bulbs are limited to an essentially spherical, ellipsoid or short tubular shapes as a result of the electromagnetic energy distribution throughout the light bulb.

Due to the present invention elongated bulbs can be used for tubular lamps or for more complex designs, such as cross- or star-shaped lamps, and others. Preferably, magnetrons emitting incident waves are positioned at the distal endings of each extremity of said shapes.

The distributed positioning of the electromagnetic sources allows for a more homogenous ionization and heating of the composition in the elongated light bulb. Since the electromagnetic waves emitted by these multiple electromagnetic sources originate from different positions in relation to the light bulb, a better uniformity throughout the specific shape of the bulb is achievable. The risk of generating local temperature hot spots is therefore further reduced, while an overall higher and more uniform heating and ionization of the plasma is possible. This in turn prevents that the temperature limit of the bulb material, preferably fused silica, is surpassed in hot-spot areas.

Employing a plurality of electromagnetic sources in a discharge lamp also provides the possibility to use several distinct bulbs, which can be enclosed in the same conductive envelope. Each light bulb is coupled to an independent electromagnetic source.

An electrodeless discharge lamp featuring multiple separate bulbs, which are each powered by their individually attributed magnetron or transistor, offers several operational freedoms. For example, different ionizable compositions may be chosen for the individual light bulbs. Such different compositions may have varying spectral characteristics. As a result, individual light bulbs can emit light of different spectra depending on which of its bulbs is ignited.

Moreover, as the composition in each bulb is ignited by an individually attributed electromagnetic radiation source, the setting of power levels of the electromagnetic sources thus offering a further mechanism to adjust or boost brightness of the electrodeless plasma lamp.

SHORT DESCRIPTION OF THE DRAWINGS

Exemplar embodiments of the invention are disclosed in the description and illustrated by the drawings in which:

FIG. 3 is a schematic illustration of an embodiment of the present invention employing three magnetrons for the ignition of a spherical discharge lamp.

FIG. 4 is a schematic illustration of a further embodiment of the present invention featuring an elongated bulb of a discharge lamp which is ignited by two magnetrons positioned at its extremities.

FIGS. 5a and 5b are schematic illustrations of an embodiment of the present invention showing the position of the plasma light bulb in its electromagnetic envelope in the light concentrator, wherein 5a shows an embodiment in which the plasma light bulb is entirely enclosed by the electromagnetic envelope, and 5b shows an embodiment in which the envelope takes on a half-dome shape connected to the convex curvature of the light concentrator, wherein the enclosure thus formed by envelope and light concentrator contains the plasma light bulb.

FIG. 6 is a schematic illustration of a further possible embodiment of the present invention showing a cross shaped bulb of a discharge lamp with magnetrons positioned at each of its extremities.

Figure 7:
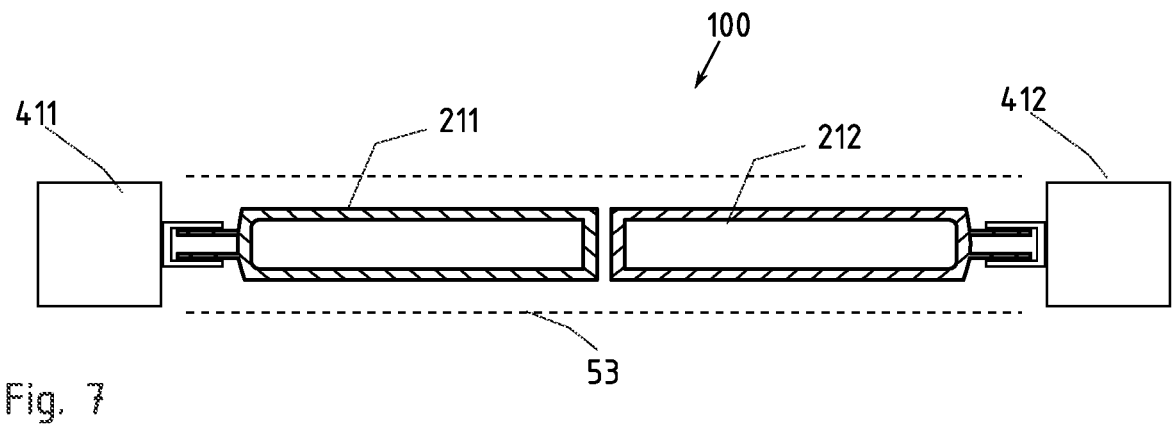

FIG. 7 is a schematic illustration of a further possible embodiment of the present invention showing a discharge lamp featuring two distinct elongated, linearly arranged bulbs with their individual magnetrons enclosed in the electromagnetic envelope.

Figure 8:
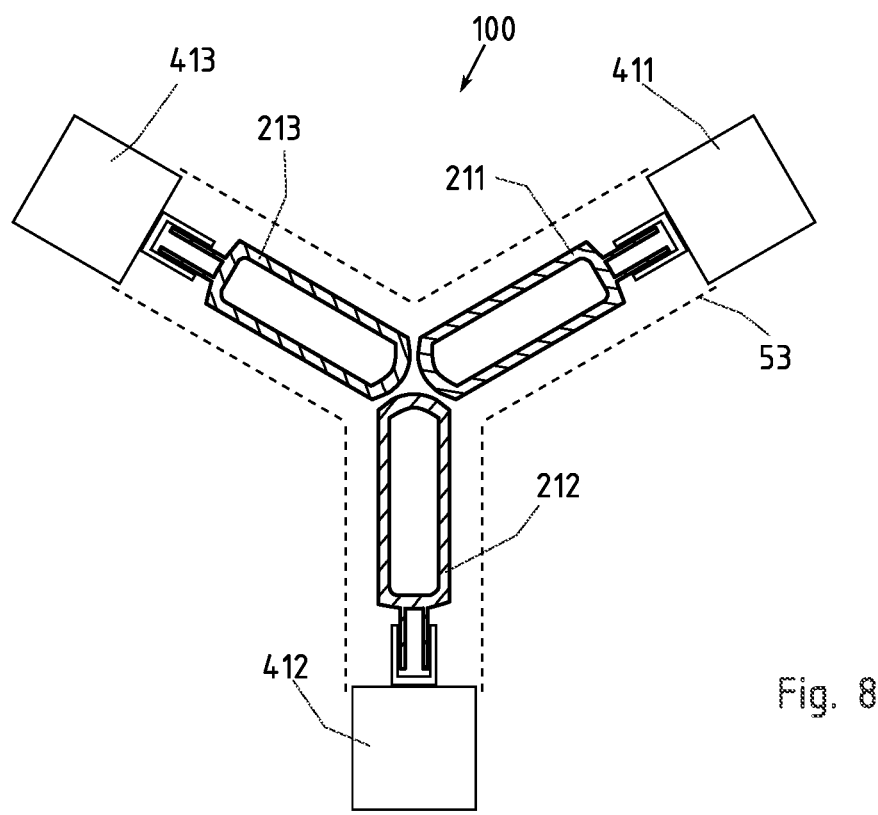

FIG. 8 is a schematic illustration of a further possible embodiment of the present invention showing a discharge lamp featuring three separate elongated bulbs with their individual magnetrons arranged in a Y shape and enclosed in the electromagnetic envelope.

EXAMPLES OF EMBODIMENTS OF THE PRESENT INVENTION

Figures 1, 2:
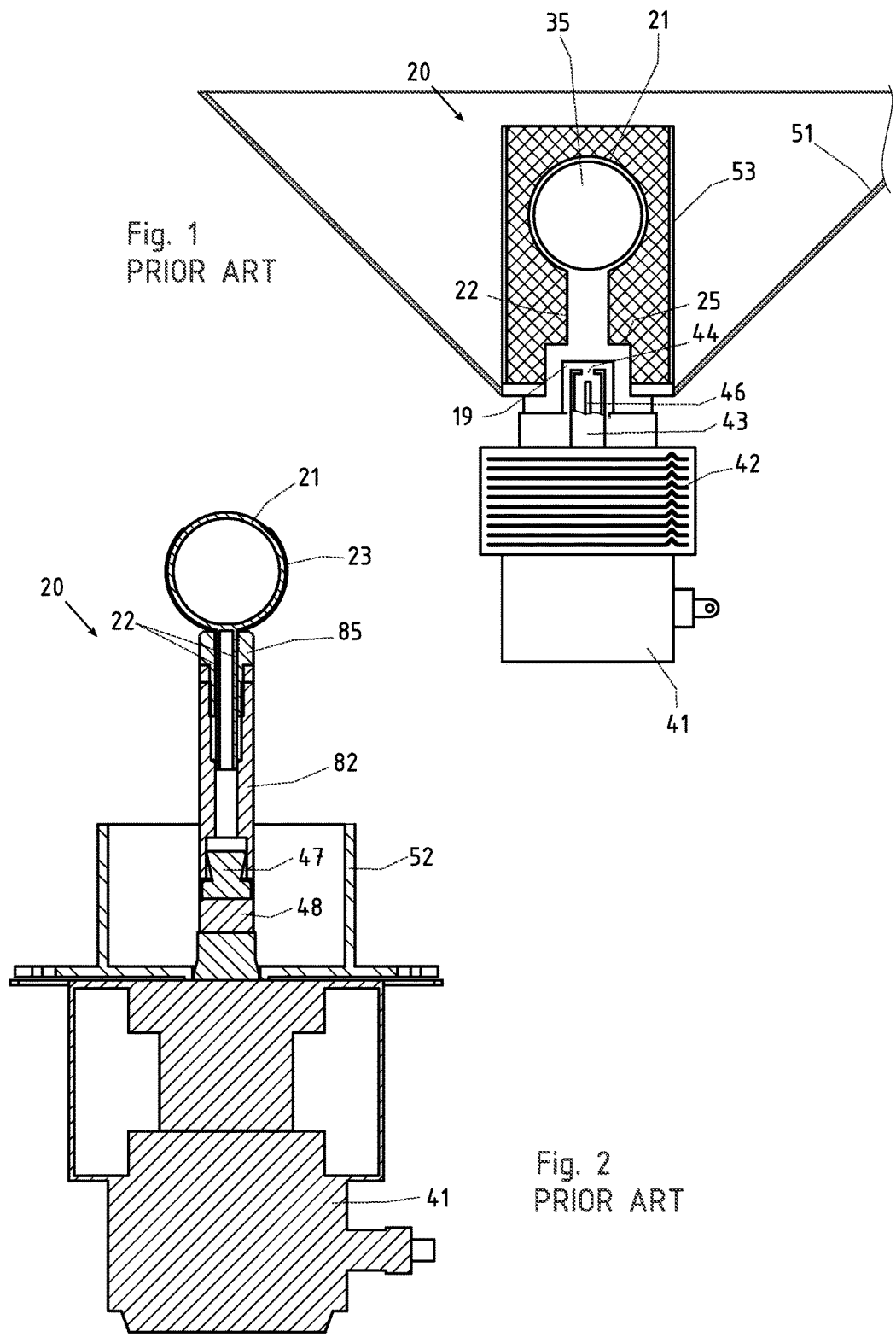
FIGS. 1 and 2 shows schematically known discharge lamps

With reference to FIG. 1, a known discharge lamp 20 uses a dielectric rod 22 for improved energy transfer to a light bulb 21. In its preferred embodiment the present invention shares the features described in said prior art document. preferably, but not necessarily, the present invention also uses the dielectric rod 22 to benefit from its advantages for temperature management in the light bulb.

FIG. 2 shows a known variant of discharge lamp in which a magnetron 41 has an output terminal 47 supported by a ceramic isolator 48 and coupled to a ¾ wavelength waveguide 82. The bulb 21 is equipped with the dielectric quartz rod 22, integrally fabricated with the bulb 21 which is inserted in the waveguide 82 and held in place by the collet 85, or by any suitable fixation means.

The discharge lamp 20 of the present invention includes a stationary, sealed bulb 21 filled with a chemical composition that is suitable for producing radiation when it is in its ionized and heated plasma state 35. The chemical composition comprises an inert gas, such as a noble gas, and an active component, which defines the spectral characteristics of the emitted light. The radiation emitted by the plasma 35 is in the visible and/or infrared and/or ultraviolet (UV) spectral range. The light bulb 21 of said discharge lamp 20 is at least partially transparent to visible or infrared or UV radiation.

Suitable chemical compositions for discharge lamps comprise light-active component known in the art. Due to the lack of electrodes or metal parts in the light bulb of RF or MW-powered discharge lamps, active components which are not chemically compatible with metal material, can also be used as active component in an inert atmosphere. Such alternative active components include Sulfur, Selenium, Tellurium and others.

In its preferred embodiment the active component of the present invention comprises a first active component consisting in of a mixture of antimony halide or bismuth halide, and a second active component consisting in a halide or in a mixture of halides of one or more of In, Sn, Ag, Cu, Fe, Pb, Hg, Co in an inert gas.

The light bulb 21 may be made from any suitable material meeting the temperature and pressure requirements for its application in the electrodeless discharge lamp. The preferred material for the light bulb 21 is fused silica. Alternatively, fused quartz, fused silica, SiO2 or any other appropriate material may be used. To be suited for its application the bulb material must be able to withstand typical operating temperatures of 600° C. to 900° C. and internal pressures ranging from 0.1 MPa to 2 MPa.

The bulb 21 is placed in a light concentrator 51 and in an electromagnetic enclosure of metallic mesh 53. The concentrator 51 has preferably reflective walls, in order to concentrate the light generated in the bulb 22 into a beam of the desired aperture, and is electrically conductive, in order to avoid transmission of the microwaves out of the lamp assembly. The metallic mesh enclosure is a conductive envelope 53 which confines the electromagnetic field inside lamp 20 and is connected mechanically and electrically to the lamp 20 by any suitable mean. The enclosure 53 could also, in a variant, be realized with sheets of a suitable transparent, translucent, or light-transmitting substrate on which a thin electrically conductive layer is deposed.

The discharge lamp further comprises a plurality of electromagnetic sources 411, 412, 413, 414, each having an output terminal 43 which radiates an electromagnetic field for ionizing and heating the chemical composition contained in the light bulb.

In a preferred embodiment the incident electromagnetic frequency/ies is in the microwave range and is produced by a magnetron tube or a transistor 41. The magnetron's output terminal 43 is suited to couple it to a standardised wavelength guide 82. Output terminals typically display a coaxial transmission line having a central conductor 46 which is closed by a cap with an aperture 44, or in a hollow ¼ wavelength waveguide. The cooling fins 42 are cooled preferably by a flow of forced air from a fan (not shown).

In the prior art lamp illustrated in FIG. 1 the bulb 21 is mounted atop a dielectric rod 22 that is in turn attached axially to a quartz socket 25 whose inner dimension correspond to the outer dimension of the microwave terminal 43, so that the latter can fit into the socket 25. The socket is slightly longer than the terminal so that an air gap 19 remains between the inner wall of the socket 25 and the terminal 43.

FIG. 3 shows a possible embodiment of a multi-magnetron discharge lamp 100, in which a plurality of magnetrons 411, 412 and 413 can be arranged to increase the electromagnetic energy transferred to a spherical light bulb and hence increase brightness of the light-emitting ionized plasma in the plasma region 35. The light bulb is enclosed in an electromagnetic envelope 53, which is penetrated by the wavelength guide 82 and the collet 85.

The light bulb of the invention is a stationary light emitting bulb. In a preferred embodiment the electromagnetic waves are transmitted to the bulb through dielectric rods 221, 222, 223. Said dielectric rods are aligned with the output terminals of the magnetrons or transistor antenna and placed between the respective output terminal and the bulb. The dielectric rods physically connect the magnetrons with the light bulb. As depicted in FIG. 2, they may be held in the interior cavity of the wavelength guide 82 and collar 85.

The dielectric rods 221, 222 and 223 enhance the efficacy of the energy transfer between the magnetrons or the transistor amplifier and the light bulb, acting as dielectric waveguide for the electromagnetic field, thus permitting the light bulb to be operated in stationary mode.

The embodiment shown in FIG. 4 show preferred positions of two magnetrons or transistor amplifiers 411 and 412 in a tubular light bulb. In order to ensure a homogeneous ionization and heating of the plasma throughout the elongated bulb, the two magnetrons are placed at its extremities. An energy source at each extremity permits for an extension of the dimensions of the light bulb to this tubular shape.

Long tubular light bulbs with high brightness are particularly suited to applications where high uniform luminance of great intensity is desirable. Elongated bulbs can for example be arranged in parallel on a planar surface such as to essentially provide a luminous surface of rectangular or other shape.

As illustrated in FIG. 5, the plasma light bulb 21 is positioned in the focal point of the light concentrator 51. The shape of the concentrator is suited to guide the reflected light towards its opening. Its preferred shape is a concave, an elliptic or a parabolic bowl, wherein the curvature of the bowl can be chosen to define the aperture of the reflected light beam.

The conductive envelope 53 may enclose the plasma light bulb 21 entirely, as is shown in FIG. 5a. Alternatively, it may connect with the inner wall of an electrically conductive region of the light concentrator 51 in such a way as to provide an enclosed space containing the plasma light bulb 21, as illustrated in FIG. 5b.

Homogenous lighting of discharge light bulbs with several tubular extensions is feasible by placing magnetron or transistor amplifier at the extremities of each extension. The number of tubular extensions is not limited. In FIG. 6 a cross-shaped bulb is depicted, employing a magnetron or transistor amplifier 411, 412, 413, 414 at each of its extremities. Further tubular shapes, for example star-shapes, ring shapes, etc, of single plasma light bulbs powered by a plurality of magnetrons are possible.

The invention is not limited to the use of one single bulb within a discharge lamp. In fact, multiple plasma light bulbs 211, 212, each powered by a magnetron 411, 412, may be comprised in a discharge lamp 100. Each magnetron or transistor amplifier can me operated independently at a chosen level of power and frequency. Preferably, said light bulbs share the same enclosing conductive envelope 53. FIG. 7 and FIG. 8 illustrate possible embodiments of such multi-plasma bulb discharge lamps. This arrangement is suited for a wide variety of different shapes, including a further elongated shape shown in FIG. 7, or a Y shape shown in FIG. 8.

The active component in each individual bulb of the multi-bulb discharge lamp may vary. This allows for excitation levels to be individually set in order to control the spectrum of the emitted light. The lamp displays the different colour spectra of its ignited bulbs. Differential regulation of the individual lightbulbs permits to introduce or expand on continuous brightness control of the light bulb, i.e. a "dimming effect". A certain degree of dimming is enabled through the adjustment of power of the igniting electromagnetic source. The employment of a plurality of electromagnetic sources broadens the range of adjustable brightness. In addition, multiple electromagnetic sources enable a higher granularity or fine tuning over the luminous intensity range.

The plurality of electromagnetic sources of the discharge lamp claimed in this invention may be electromagnetically coupled with one stationary light bulb, as exemplified in FIGS. 3, 4 and 6. In an alternative embodiment multiple electromagnetic sources are couples to on light bulb each, wherein multiple light bulbs are comprised in one discharge lamp, as shown in FIGS. 7 and 8.

REFERENCE NUMBERS USED IN THE FIGURES 19 air gap
20 discharge lamp 21 bulb
22 dielectric rod
23 light diffuser film
25 socket
35 plasma region
41 magnetron
42 cooling fins
43 terminal/electromagnetic wave launcher (partially in section)
44 aperture
46 coaxial line
47 RF terminal
48 insulator
51 light concentrator
52 supporting collar
53 electromagnetic envelope
82 ¾ wavelength guide
85 collet
100 multi-magnetron discharge lamp
211 first light bulb
212 second light bulb
213 third light bulb
221 first dielectric rod
222 second dielectric rod
223 third dielectric rod
411 first magnetron
412 second magnetron
413 third magnetron

The invention claimed is:

1. An electrodeless discharge lamp for providing visible and/or infrared and/or UV radiation comprising an electrically conductive envelope that is at least partially transparent to visible and/or infrared and/or UV radiation, one or more stationary light emitting bulbs inside the conductive envelope, the one or more bulbs being filled with a composition that emits light when in plasma state, wherein the one or more bulbs each have several tubular extensions, a plurality of electromagnetic sources each electromagnetic source having an output terminal located at an extremity of one of the tubular extensions radiating an electromagnetic field for ionizing and heating the composition in the one or more bulbs to bring it in a plasma state.

2. The electrodeless discharge lamp of claim 1, wherein the conductive envelope has at least a region constituted by a conductive mesh.

3. The electrodeless discharge lamp of claim 1, wherein the bulbs are made of fused quartz, fused silica, SiO2 or any other appropriate material may be used.

4. The electrodeless discharge lamp of claim 1, wherein the electromagnetic sources are in between the high frequency and the microwave range.

5. The electrodeless discharge lamp of claim 1, wherein the composition of at least one bulb comprises an inert gas, a first active component consisting of a mixture of antimony halide or bismuth halide, a second active component consisting in a halide or in a mixture of halides of one or more of In, Sn, Ag, Cu, Fe, Pb, Co and Hg.

6. The electrodeless discharge lamp of claim 1, comprising one or more dielectric rods aligned with one of the output terminals of the electromagnetic source and positioned between the respective output terminal and the bulb acting as dielectric waveguide for the electromagnetic field, coupling the electromagnetic source with the bulb.

7. The electrodeless discharge lamp of claim 1, wherein at least one of the stationary light-emitting bulbs is electromagnetically coupled with more than one electromagnetic sources.

8. The electrodeless discharge lamp of claim 1, comprising a plurality of stationary light emitting bulbs wherein the bulbs are filled with compositions having different spectra of emission and are coupled to different electromagnetic sources and the electromagnetic sources can be operated at variable levels of power, wherein the levels of power of the electromagnetic sources can be set independently from one another.

9. The electrodeless discharge lamp of claim 1, the tubular extensions being configured to provide a cross-shaped light emitting bulb or star-shaped light emitting bulb.

10. The electrodeless discharge lamp of claim 1, wherein the stationary light emitting bulbs have essentially tubular shape and are electromagnetically coupled with one electromagnetic source at one extremity or are electromagnetically coupled with one electromagnetic source at each of two extremities.

11. The electrodeless discharge lamp of claim 10, including a concave or parabolic light concentrator.

12. The electrodeless discharge lamp of claim 11, wherein the light concentrator has at least an electrically conductive region and the electrically conductive region of the light concentrator is part of the conductive envelope.

* * * * *